(12) United States Patent
Sakai et al.

(10) Patent No.: US 11,561,555 B2
(45) Date of Patent: Jan. 24, 2023

(54) CONTROL APPARATUS, SYSTEM, COMPUTER READABLE STORAGE MEDIUM AND CONTROL METHOD

(71) Applicant: HONDA MOTOR CO., LTD., Tokyo (JP)

(72) Inventors: Rei Sakai, Saitama (JP); Yo Ito, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 17/185,983

(22) Filed: Feb. 26, 2021

(65) Prior Publication Data

US 2021/0286372 A1 Sep. 16, 2021

(30) Foreign Application Priority Data

Mar. 16, 2020 (JP) .............................. JP2020-045692

(51) Int. Cl.
*G05D 1/02* (2020.01)
*G08G 1/09* (2006.01)
*G08G 1/01* (2006.01)

(52) U.S. Cl.
CPC ......... *G05D 1/0276* (2013.01); *G05D 1/0214* (2013.01); *G08G 1/0104* (2013.01); *G08G 1/091* (2013.01)

(58) Field of Classification Search
CPC .. G05D 1/0276; G05D 1/0214; G05D 1/0253; G05D 1/0223; G05D 1/0257; G05D 1/0259; G05D 1/028; G05D 2201/0213; G08G 1/0104; G08G 1/091; G08G 1/093
See application file for complete search history.

(56) References Cited

U.S. PATENT DOCUMENTS

| | | | |
|---|---|---|---|
| 2018/0065549 A1 | 3/2018 | Watanabe | |
| 2020/0189617 A1* | 6/2020 | Takada | G05D 1/0061 |

FOREIGN PATENT DOCUMENTS

| | | | |
|---|---|---|---|
| DE | 102017010488 A1 * | 7/2018 | |
| JP | 2005135037 A | 5/2005 | |
| JP | 2018041328 A | 3/2018 | |

* cited by examiner

*Primary Examiner* — Rodney A Butler

(57) ABSTRACT

Provided is a control apparatus for controlling broadcast data to be broadcasted to an occupant of a movable object with an automated drive function, comprising: a travelling road identification unit for identifying a predetermined travelling road of the movable object corresponding to a destination set in the movable object; a setting unit for setting, according to the predetermined travelling road, a recommended switching point for switching predetermined automated drive to driver subjected manual drive in the predetermined travelling road, and setting predetermined passage time when the movable object passes through the recommended switching point; and a broadcast plan generation unit for generating a broadcast plan for broadcasting predetermined broadcast data to an occupant of the movable object according to the recommended switching point; wherein the broadcast plan generation unit determines an order of the broadcast data to be broadcasted within a predetermined period before or after the recommended switching point.

20 Claims, 13 Drawing Sheets

| TYPE | AUTOMATED DRIVE LEVEL | | | | | |
|---|---|---|---|---|---|---|
| | 5 | 4 | 3 | 2 | 1 | 0 |
| ROAD A | 6 | 6 | 6 | 6 | 6 | 6 |
| ROAD B | 5 | 5 | 5 | 5 | 5 | 5 |
| ROAD C | 4 | 4 | 4 | 4 | 4 | 4 |
| ADVERTISEMENT A | 3 | 3 | 3 | 2 | 2 | 2 |
| ADVERTISEMENT B | 2 | 2 | 2 | 2 | 2 | 2 |
| ADVERTISEMENT C | 1 | 1 | 1 | 0 | 0 | 0 |
| NEWS A | 3 | 3 | 3 | 2 | 2 | 2 |
| NEWS B | 2 | 2 | 2 | 1 | 1 | 0 |
| NEWS C | 1 | 1 | 1 | 0 | 0 | 0 |
| CHAT | 1 | 1 | 1 | 0 | 0 | 0 |

FIG. 8

| USER | ACTION INFORMATION | | | |
|---|---|---|---|---|
| | CHERRY BLOSSOM | HOT SPRING | RESTAURANT | ... |
| U001 | 5 | 2 | 3 | ... |
| U002 | 0 | 0 | 0 | ... |
| ... | ... | ... | ... | ... |

*FIG. 10*

| USER | ACTION INFORMATION ||
| | DESTINATION REL-ATED ADVERTISEMENT | WAYPOINT RELATED ADVERTISEMENT |
| --- | --- | --- |
| U001 | 2 | 5 |
| U002 | 0 | 0 |
| ... | ... | ... |

FIG. 11

CONTROL APPARATUS, SYSTEM, COMPUTER READABLE STORAGE MEDIUM AND CONTROL METHOD

CROSS REFERENCE TO RELATED APPLICATION

The contents of the following Japanese patent application are incorporated herein by reference, Japanese Patent Application NO. 2020-045692 filed on Mar. 16, 2020.

BACKGROUND

1. Technical Field

The present invention relates to a control apparatus, a system, a computer readable storage medium and a control method.

2. Related Art

Patent Document 1 states that "when a driver is estimated to have recognized the contents of the displayed warning, the method of displaying the warning is to be changed (brightness is reduced, the display position is changed, the display is stopped or the like)". Patent Document 2 states that "information related to the surrounding information is repeatedly presented to the driver while automated drive continues".

PRIOR ART DOCUMENT

Patent Document

Patent Document 1: Japanese Patent Application Publication No. 2005-135037
Patent Document 2: Japanese Patent Application Publication No. 2018-41328

BRIEF DESCRIPTION OF THE DRAWINGS

FIG. 8 illustrates information intensity per type of the broadcast data.
FIG. 10 illustrates a data structure of first occupant action information for evaluating a first action of an occupant 80.
FIG. 11 illustrates a data structure of second occupant action information for evaluating a second action of the occupant 80.

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
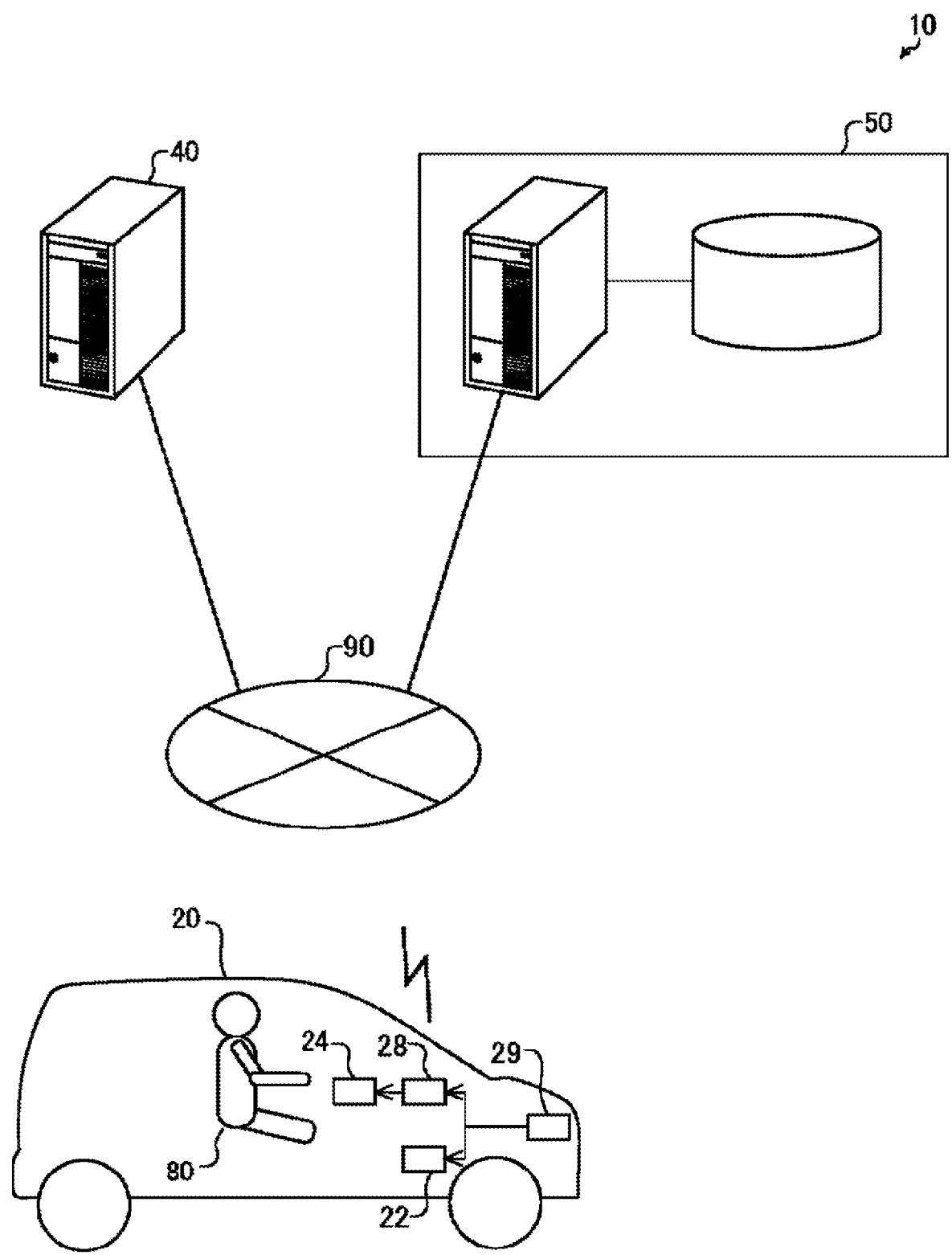
FIG. 1 schematically illustrates a configuration of a system 10.

FIG. 1 schematically illustrates a configuration of a system 10. The system 10 includes a movable object 20, a broadcast server 40 and a content server 50. The system 10 is a system for providing broadcast data to the movable object 20.

The movable object 20, the broadcast server 40 and the content server 50 are connected to a network 90. The network 90 includes a communications line such as the Internet and the mobile communication network. The broadcast server 40 is configured to communicate with the content server 50 and the movable object 20 through the network 90.

The content server 50 is configured to acquire video data or textual data provided by video transmission services, textual data and image data such as still image data or video data included in posted information of SNS (social network services), image data and textual data included in webpage and so on on the network 90, and to store them in a database. Also, the content server 50 is configured to acquire audio data, textual data and image data distributed through a television broadcast or a radio broadcast, and stores them in a database. The content server 50 is configured to acquire advertising data from an advertising distribution company and stores it in a database. Also, the content server 50 is configured to acquire news information from a news provider company and stores it in a database. The content server 50 is configured to transmit the content data to the broadcast server 40 according to a request from the broadcast server 40.

The content data may include, for example, clock time information, location information and phenomenon information. The clock time information indicates clock time corresponding to the phenomenon information. The location information indicates a location corresponding to the phenomenon information. The phenomenon information includes weather information, accident information, event information, construction information and traffic jam information, advertising information, news information and so on.

The movable object 20 has an automated drive function. The movable object 20 includes an automated drive control apparatus 22, a broadcast apparatus 24, a communication apparatus 28 and a sensor 29. The sensor 29 includes a radar, a camera, a positioning apparatus, a speed sensor and so on. The automated drive control apparatus 22 is configured to provide the automated drive function to the movable object 20. For example, the automated drive control apparatus 22 is configured to automatically control the steering or the acceleration and deceleration of the movable object 20. The automated drive control apparatus 22 is configured to automatically control the steering or the acceleration and deceleration of the movable object 20 by using the information acquired by the sensor 29. The automated drive function of the automated drive control apparatus 22 may be an automated drive function for controlling the steering and the acceleration and deceleration in a mode with a higher intervention degree in the driving by the system. In this case, since the intervention degree by the occupant of the movable object 20 in the driving is relatively low, the attention degree of the occupant with respect to the broadcast tends to be higher, thus it is suitable for providing broadcast data. The automated drive control apparatus 22 may have a function of advanced driver-assistance systems (ADAS). The automated drive control apparatus 22 is realized by, for example, an ECU (Electronic Control Unit) including a microcomputer. The communication apparatus 28 is configured to communicate with the broadcast server 40 through the network 90. The communication apparatus 28 is configured to transmit destination information of the movable object 20 to the broadcast server 40. Also, the communication apparatus 28 is configured to transmit location information of the movable object 20, speed information of the movable object 20, control information related to the automated drive function of the movable object 20, surrounding image information of the movable object 20, information related to the occupant 80 of the movable object 20 and so on, which is acquired by the sensor 29, to the broadcast server 40. The communication apparatus 28 may be configured by including a telematics control unit (TCU). The occupant 80 may be a driver of the movable object 20.

The broadcast server 40 is configured to generate broadcast data based on the information collected from a plurality of movable objects including the movable object 20, or the information received from the content server 50. For example, the broadcast server 40 is configured to identify a predetermined travelling route to a destination based on the destination of the movable object 20. The broadcast server 40 is configured to determine an automated drive level of the movable object 20 within a plurality of sections inside the predetermined travelling route based on road information in the predetermined travelling route. It is noted that an automated drive level of SAE J3016, for example, may be applied as the automated drive level. In this case, an automated drive level 0 to an automated drive level 2 may correspond to a driver subjected manual drive mode, and automated drive level 3 to automated drive level 5 may correspond to an automated drive control apparatus 22 subjected automated drive mode.

Also, the broadcast server 40 is configured to set a waypoint on the predetermined travelling route of the movable object 20. The broadcast server 40 is configured to acquire the content, which is the source of the broadcast data provided to the occupant 80, from the content server 50, based on the information of the point where the automated drive level switches or the waypoint, or the occupant information and so on acquired from the movable object 20, and to generate the broadcast data. For example, the broadcast server 40 is configured to acquire the content data associated to the switching point of the automated drive level of the movable object 20, and associated to the clock time for the movable object 20 to pass through the switching point, and to generate a broadcast plan for determining the timing for transmitting the broadcast data to the movable object 20. For example, the broadcast server 40 is configured to determine the timing for broadcasting the broadcast data of the switch of the automated drive level. Also, the broadcast server 40 is configured to determine the clock time and the time length for broadcasting the broadcast data. The broadcast server 40 is configured to generate the broadcast data according to the travel plan in response to the travelling of the movable object 20, and to transmit it to the movable object 20.

In the movable object 20, when the communication apparatus 28 receives the broadcast data from the broadcast server 40, the broadcast apparatus 24 is configured to broadcast the broadcast data received by the communication apparatus 28 to the occupant 80. For example, the broadcast apparatus 24 has a HMI (Human Machine Interface) function and the broadcast apparatus 24 broadcasts the broadcast data in a formation of audio information or image information. According to the system 10, the broadcast data related to the point where the movable object 20 is travelling or the switch of the automated drive level of the movable object 20 can be broadcasted to the occupant 80 at appropriate timing.

Figure 2:
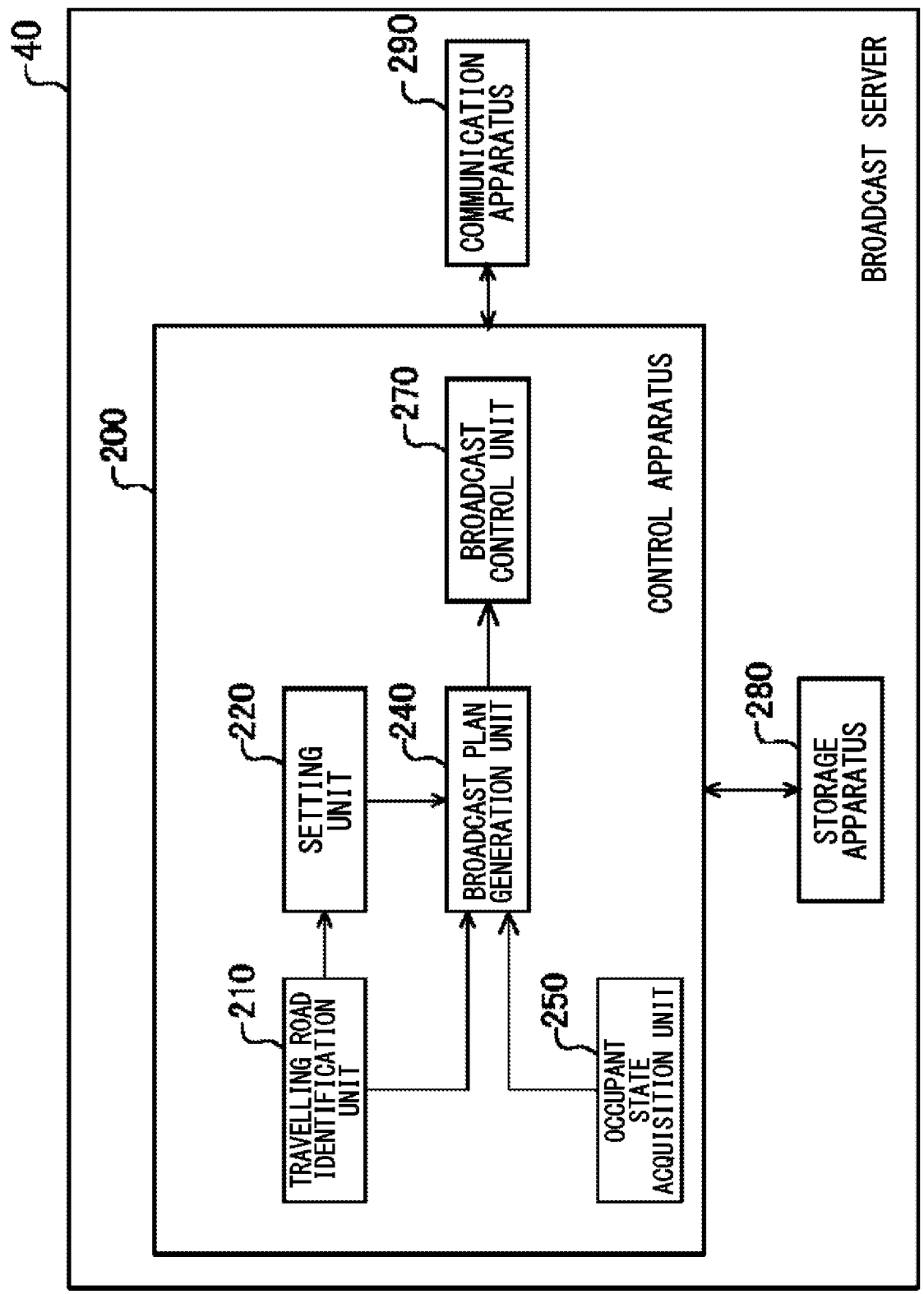
FIG. 2 illustrates a system configuration of a broadcast server 40.

FIG. 2 illustrates a system configuration of the broadcast server 40. The broadcast server 40 includes a control apparatus 200, a storage apparatus 280 and a communication apparatus 290. The control apparatus 200 is realized by, for example, comprising an arithmetic processing apparatus including a processor. The storage apparatus 280 is realized by comprising a non-volatile storage media. The control apparatus 200 is configured to perform processing using the information stored in the storage apparatus 280. The communication apparatus 290 is responsible for the communication with the movable object 20 and the content server 50.

The control apparatus 200 is configured to control the broadcast data to be broadcasted to the occupant 80. The control apparatus 200 includes a travelling road identification unit 210, a setting unit 220, a broadcast plan generation unit 240, an occupant state acquisition unit 250 and a broadcast control unit 270.

The travelling road identification unit 210 is configured to identify the predetermined travelling road of the movable object 20 corresponding to the destination set by the movable object 20. It is noted that the travelling road identification unit 210 may also acquire the predetermined travelling road information determined by the car navigation system included in the movable object 20.

The setting unit 220 is configured to set, according to the predetermined travelling road, the recommended switching point predetermined for switching from automated drive to driver subjected manual drive in the predetermined travelling road, and to set the predetermined passage time for the movable object 20 to pass through the recommended switching point. The broadcast plan generation unit 240 is configured to generate the broadcast plan for broadcasting the broadcast data predetermined according to the recommended switching point to the occupant 80 of the movable object 20. More specifically, the broadcast plan generation unit 240 is configured to determine the order of the broadcast data broadcasted within a predetermined period before or after the recommended switching point, based on the information attribute of the broadcast data.

The broadcast plan generation unit 240 is configured to array the broadcast data so that the order of the information attribute of the broadcast data to be broadcasted is a predetermined order within a predetermined period before the recommended switching point.

For the automated drive, a plurality of automated drive modes are set according to the amount of operations of the automated drive control apparatus 22 included in the movable object 20. The broadcast plan generation unit 240 is configured to set the broadcast data of the information attribute corresponding to the automated drive mode set by the predetermined travelling road.

The information attribute may include information intensity of the broadcast data. The broadcast data includes road related broadcast data and advertising data related to the predetermined travelling road, and the information intensity of the road related broadcast data may be higher than that of the advertising data. The broadcast data includes the road related broadcast data related to the predetermined travelling road and the waypoint related broadcast data related to the waypoint of the predetermined travelling road, and the information intensity of the road related broadcast data may be higher than that of the waypoint related broadcast data.

The occupant state acquisition unit 250 is configured to acquire the state of the occupant 80 of the movable object 20. The broadcast plan generation unit 240 is configured to identify actions of the occupant 80 with respect to the broadcast of the broadcast data based on the state of the occupant 80, and sets the information intensity for the broadcast data of every occupant 80 based on the actions of the occupant 80. For example, the occupant state acquisition unit 250 is configured to acquire the information detected by the sensor 29 of the movable object 20 through the communication apparatus 290. The location history of the movable object 20, the facial expression of the occupant 80 or the like can be exemplified as the information acquired by the occupant state acquisition unit 250.

The advertising data includes destination related advertising data related to the destination and waypoint related advertisement data related to the waypoint of the predetermined travelling road. The broadcast plan generation unit 240 is configured to set the information intensity for the destination related advertising data and the waypoint related advertisement data of every occupant 80, based on the actions of the occupant 80 with respect to the broadcast of the destination related advertising data and the waypoint related advertisement data.

The information attribute may include types of the broadcast data. The broadcast plan generation unit 240 is configured to select a plurality of broadcast data that should be continuously broadcasted based on the type of the broadcast data, and is configured to determine the order of broadcasting the plurality of selected broadcast data with consideration of the information intensity identified based on the actions of the occupant 80. In this way, while presenting the predetermined types of broadcast data together, it is possible to take into account the interests of the occupant 80 and set the order of broadcasting the broadcast data.

The broadcast control unit 270 is configured to perform the broadcast based on the broadcast data, based on the broadcast plan generated by the broadcast plan generation unit 240. For example, the broadcast control unit 270 is configured to cause the broadcast data to be transmitted to the movable object 20 through the communication apparatus 290, thereby performing the broadcast to the occupant 80.

Figure 3:
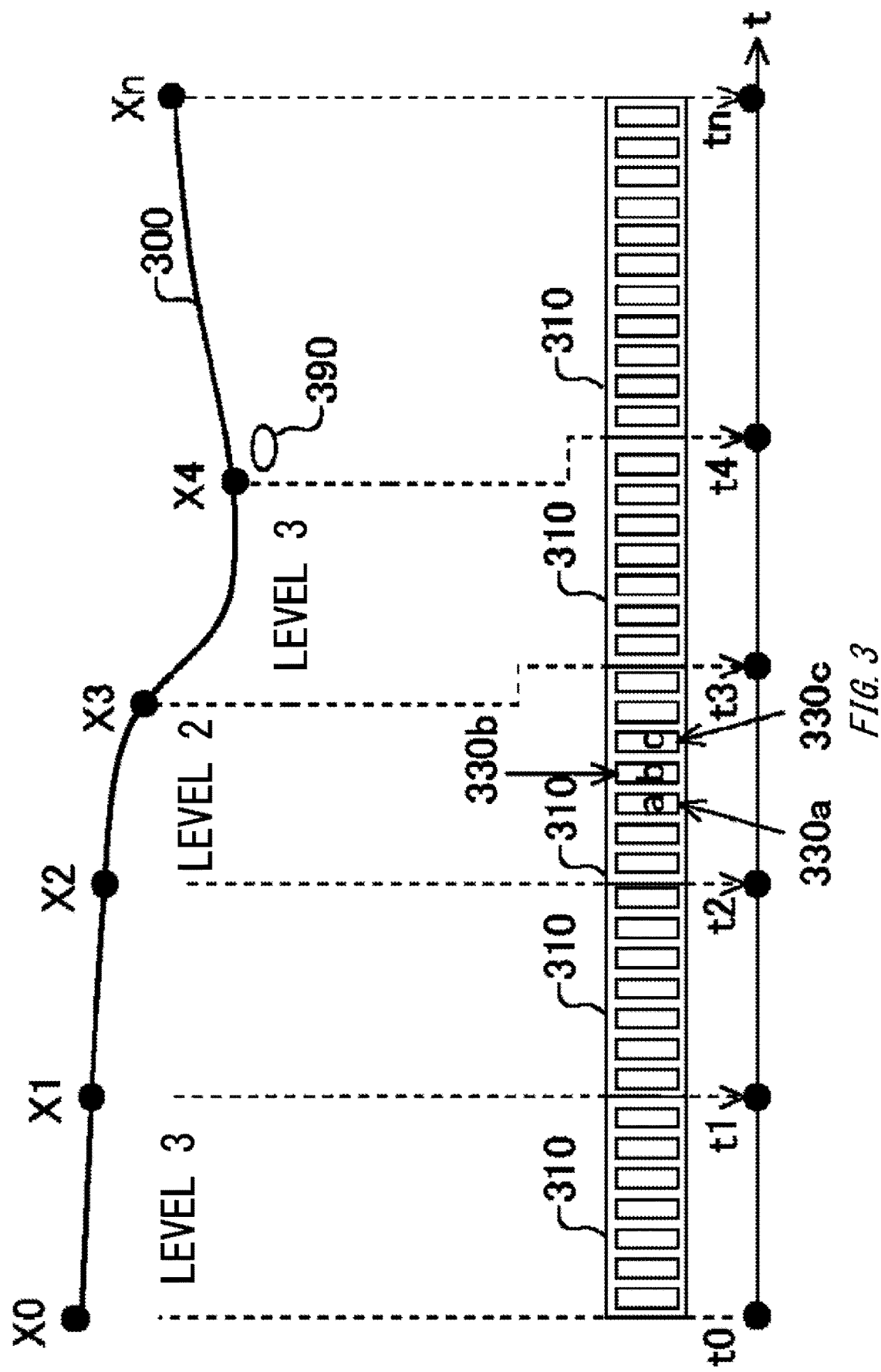
FIG. 3 illustrates a description of a management unit in which the broadcast data is set.

FIG. 3 illustrates a description of a management unit in which the broadcast data is set. The point X0 is the departure point of the movable object 20. The point Xn is the destination of the movable object 20. The predetermined travelling road 300 is a road on which the movable object 20 is expected to travel. The predetermined travelling road 300 is determined by the travelling road identification unit 210.

The setting unit 220 is configured to set a plurality of points including point X1 to X4 on the predetermined travelling road 300. For example, when the setting unit 220 is configured to determine that the movable object 20 travels at automated drive level 3 on the road from the point X0 to X2, is configured to determine that the movable object 20 travels at automated drive level 2 from the point X2 to the point X3, and is configured to determine that the movable object 20 travels at automated drive level 3 from the point X3 to the point X4, the setting unit 220 sets the X2 and the X3 as the recommended switching points for switching the automated drive level.

Also, when the interval between the point X0 and the point X2 exceeds a predetermined distance, the setting unit 220 is configured to set the point X1 between the point X0 and the point X2. For example, the setting unit 220 may determine the point X1 according to the travelling time of the movable object 20. For example, the setting unit 220 may determine the point, to which the movable object 20 has been travelling for approximately 1 hour from the point X0, as the X1. Also, the setting unit 220 is configured to set the point X4 in the vicinity of a point where a specific spot 390, such as a sightseeing spot or a facility, is located, on the predetermined travelling road 300.

The broadcast plan generation unit 240 is configured to set one management unit 310 for each of the plurality of periods delimited by the clock time corresponding to the points set by the setting unit 220. The broadcast plan generation unit 240 is configured to set a plurality of broadcast data 330 inside each management unit 310. As one example, the broadcast plan generation unit 240 is configured to set broadcast data 330*c* for broadcasting the switch of the automated drive level to the occupant 80 within a management unit before the timing corresponding to the recommended switching point X2. Also, the broadcast plan generation unit 240 is configured to set broadcast data 330*b*, which are advertising data, or broadcast data 330*a*, which are news data, before the broadcast data 330*c*. The broadcast plan generation unit 240 is configured to select the advertising data or the news data based on the interest information of the occupant 80, or the point where the movable object 20 exists at the timing of the broadcast, then sets them as the broadcast data 330 within the a management unit. In this way, the broadcast plan generation unit 240 is configured to generate the broadcast plan in advance based on the recommended switching point of the automated drive level, and the broadcast control unit 270 is configured to transmit the broadcast data to the movable object 20 according to the broadcast plan generated by the broadcast plan generation unit 240.

Figure 4:
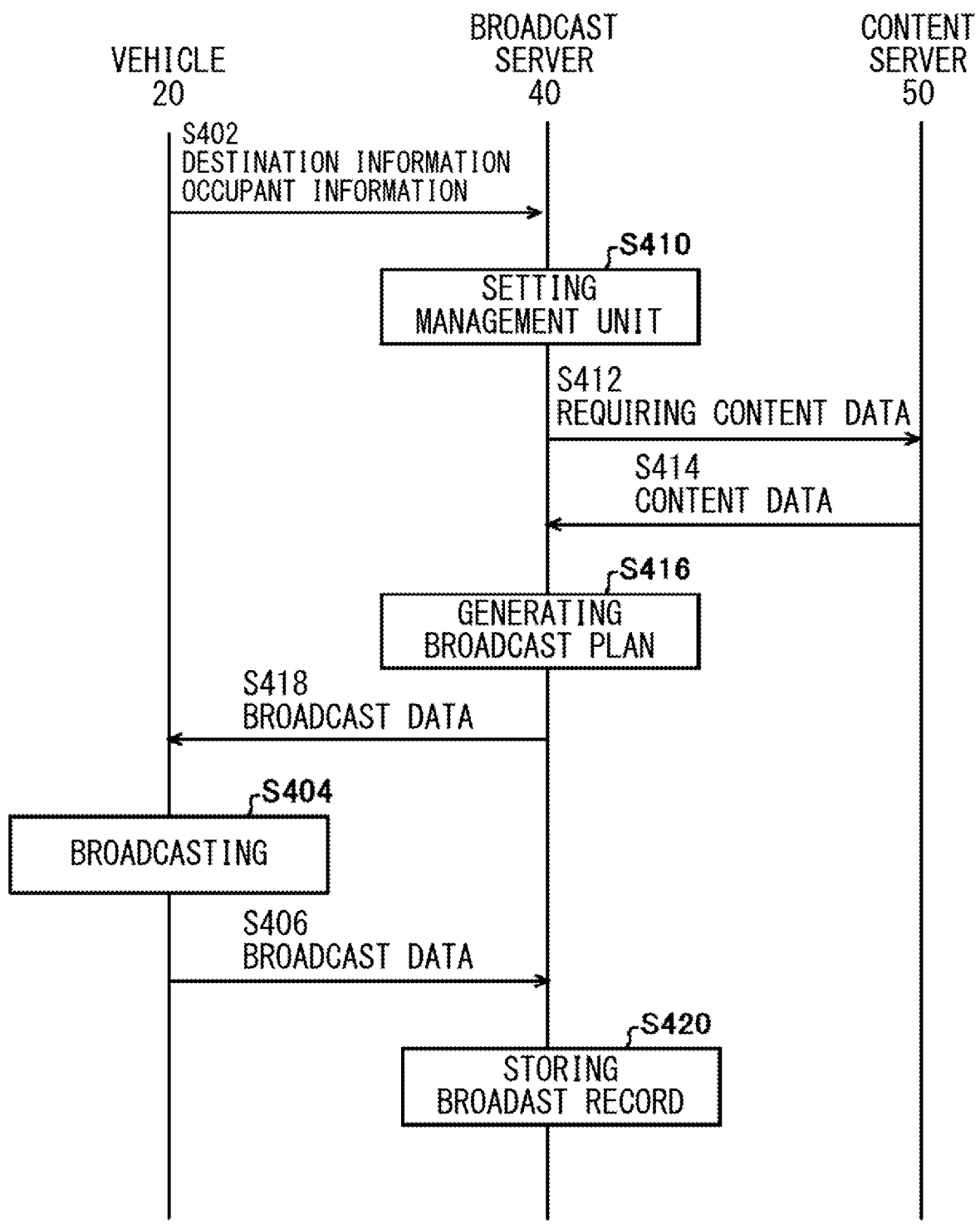
FIG. 4 illustrates a flow of data between a movable object 20, the broadcast server 40 and a content server 50.

FIG. 4 illustrates a flow of data between the movable object 20, the broadcast server 40 and the content server 50. In S402, the communication apparatus 28 is configured to transmit the destination information set by the occupant 80 and the information of the occupant 80 to the broadcast server 40. The information of the occupant 80 may include the identification information of the occupant 80, the interest information of the occupant 80 or the like. In S410, the broadcast plan generation unit 240 is configured to set the management unit. More specifically, the travelling road identification unit 210 is configured to set the predetermined travelling road based on the destination and the road information, and the setting unit 220 is configured to set the automated drive level of the movable object 20, the recommended switching point X and the clock time for passing through the point X of each spot, and the broadcast plan generation unit 240 is configured to set the management unit.

In S412, the communication apparatus 290 is configured to transmit the content data request information related to the point on the predetermined travelling road to the content server 50. In S414, the communication apparatus 290 is configured to receive the content data from the content server 50. In S416, the broadcast plan generation unit 240 is configured to generate the broadcast data based on the content data, and assign the broadcast data within the management unit. In S418, the communication apparatus 290 is configured to transmit the broadcast data to the movable object 20. In S404, the broadcast apparatus 24 is configured to broadcast to the occupant 80 according to the received broadcast data. When the broadcast data is the advertising data, after the broadcast apparatus 24 has performed the broadcast, in S406, the communication apparatus 28 is configured to transmit information indicating that the broadcast of the broadcast data has been performed to the broadcast server 40. In S420, the broadcast server 40 is configured to store the broadcast record information indicating that the broadcast has been completed in the storage apparatus 280. The broadcast server 40 is configured to bill the operator who has provided the content data based on the broadcast record information.

Figure 5:
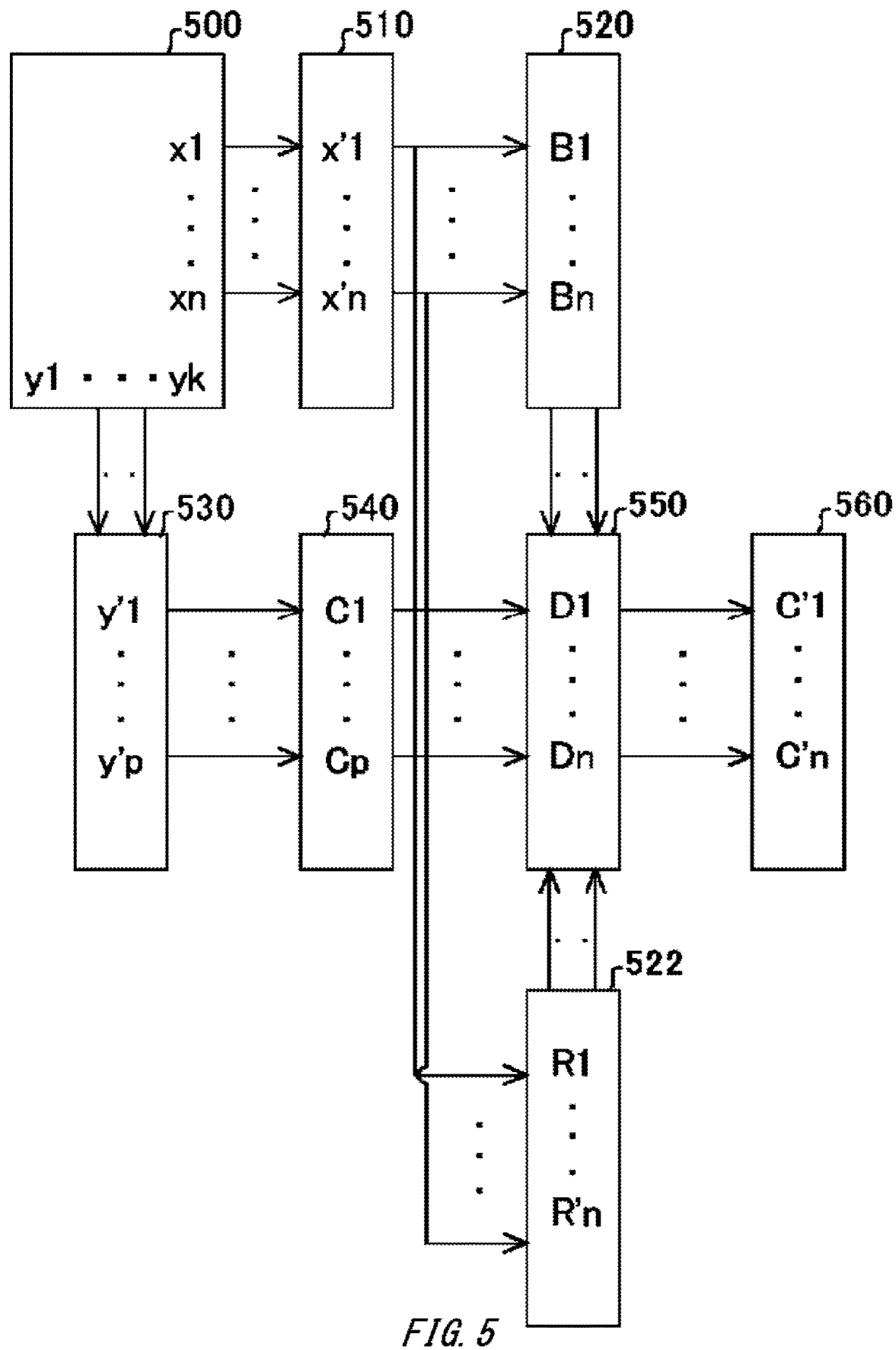
FIG. 5 illustrates one example of a generation flow of a broadcast plan.

FIG. 5 illustrates one example of the generation flow of the broadcast plan. The setting unit 220 is configured to generate waypoint information x (x1~xn) and recommended switching point information y (y1~yk) based on the information of the predetermined travelling road identified by the travelling road identification unit 210 based on the current location and the destination of the movable object 20 (block 500). The setting unit 220 is configured to identify point information x' (x'1~x'n) associated with the waypoint information x (block 510). The broadcast plan generation unit 240 is configured to generate broadcast data B (B1~Bn) based on the point information x' (block 520). The content data B may be, for example, the broadcast data generated from the content data that is locally managed by the broadcast server 40 itself. Also, the broadcast plan generation unit 240 is configured to acquire broadcast data R and R' (R1~Rn, R'~R'n) based on the point information associated with the waypoint information x (block 522). The content data R may be, for example, the broadcast data generated from the content data that is acquired from the content server 50.

The broadcast plan generation unit 240 is configured to identify point information y' (y'1~y'p) associated with the recommended switching point y (block 530). The broadcast plan generation unit 240 is configured to acquire broadcast data C (C1~Cp) based on the point information y' (block 540). The broadcast data C may be the broadcast data generated from the content data that is acquired from the content server 50. The broadcast data C may be the broadcast data generated by the broadcast server 40. For example, the broadcast data C may be the broadcast data for broadcasting the switch of the automated drive level.

The broadcast plan generation unit 240 is configured to generate a set D (D1~Dn) of the broadcast data B, the broadcast data R and the broadcast data C (block 550). The broadcast plan generation unit 240 is configured to determine the order of the broadcast data set within the management unit, and to set broadcast data (C'~C'q) within the management unit from the set D (block 560). In this way, the broadcast plan generation unit 240 is configured to generate the broadcast plan.

Figure 6:
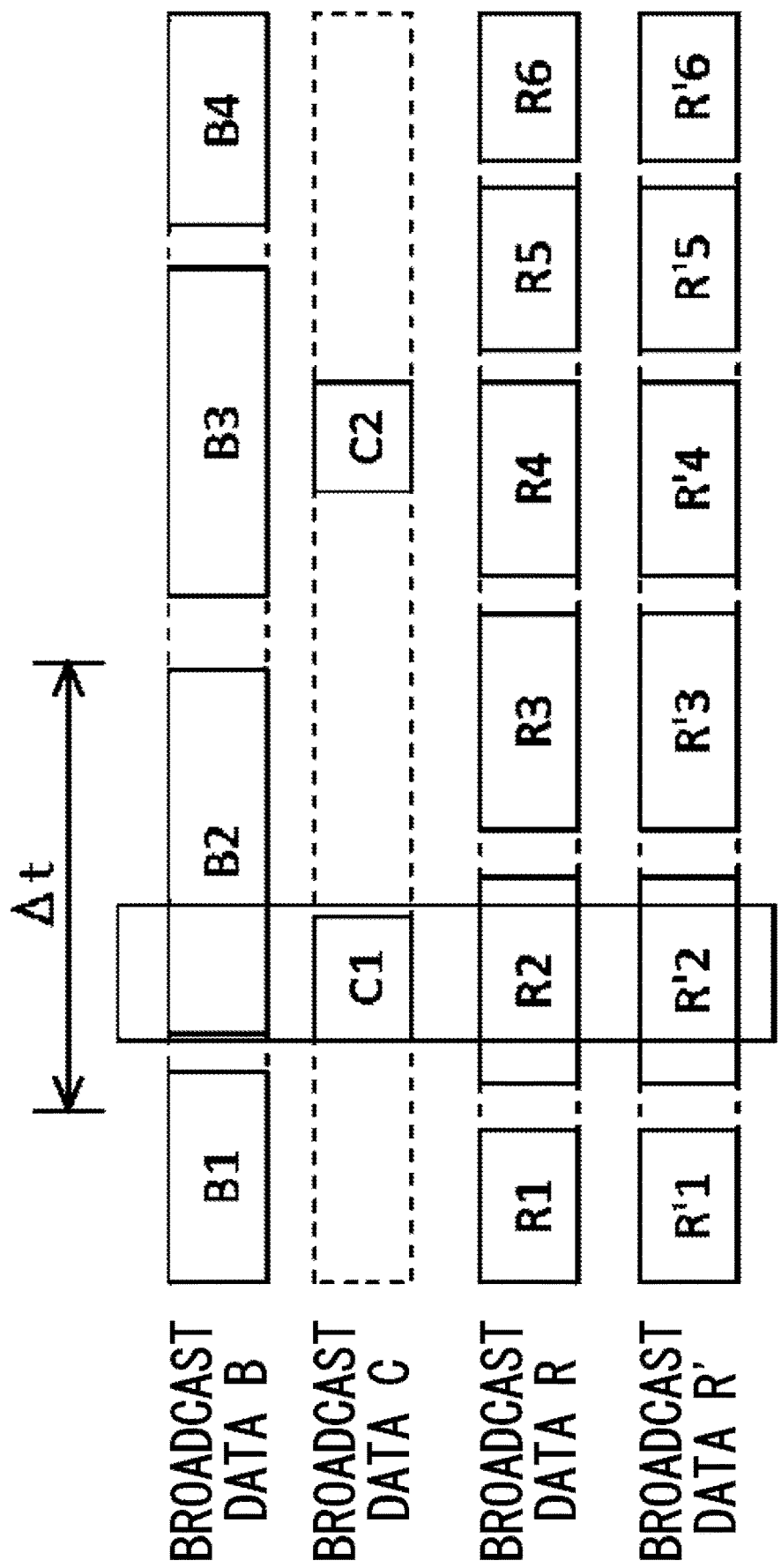
FIG. 6 illustrates one example of another generation flow of the broadcast plan.

FIG. 6 illustrates one example of another generation flow of the broadcast plan. The broadcast data B, the broadcast data C, the broadcast data R and the broadcast data R' are the broadcast data generated by the same method with the method described with reference to FIG. 4. The broadcast plan generation unit 240 is configured to arrange the broadcast data B in a time sequence according to predetermined criteria. Similarly, the broadcast plan generation unit 240 is configured to arrange the broadcast data C in a time sequence according to predetermined criteria. Also, the broadcast plan generation unit 240 is configured to arrange the broadcast data R in a time sequence according to predetermined criteria. Also, the broadcast plan generation unit 240 is configured to arrange the broadcast data R' in a time sequence according to predetermined criteria. In the case of selecting the broadcast data to be broadcasted within a coming period $\Delta$ t, the broadcast plan generation unit 240 is configured to select and broadcast one broadcast data of a plurality of broadcast data arranged within $\Delta$ t. For example, the broadcast plan generation unit 240 is configured to select one broadcast data from a plurality of broadcast data B2, C1, R2 and R'2.

It is noted that the broadcast plan generation unit 240 may select one broadcast data based on the priority information respectively corresponding to the plurality of broadcast data. Also, the broadcast plan generation unit 240 may also select the plurality of the broadcast data. For example, the broadcast plan generation unit 240 may select the broadcast data C1 and the broadcast data R 2 as the broadcast data to be broadcasted within $\Delta$ t. In this case, the broadcast plan generation unit 240 may set the broadcast data C1 and the broadcast data R2 to be broadcasted in a staggered manner within the clock time $\Delta$t.

In this way, the broadcast plan generation unit 240 is configured to generate a plurality of broadcast plans including a plurality of the broadcast data from the current point, the passing point or the destination point of the movable object 20, and may select and broadcast the broadcast data corresponding to the recommended switching point of the plurality of broadcast data included in the plurality of generated broadcast plans.

Figure 7:
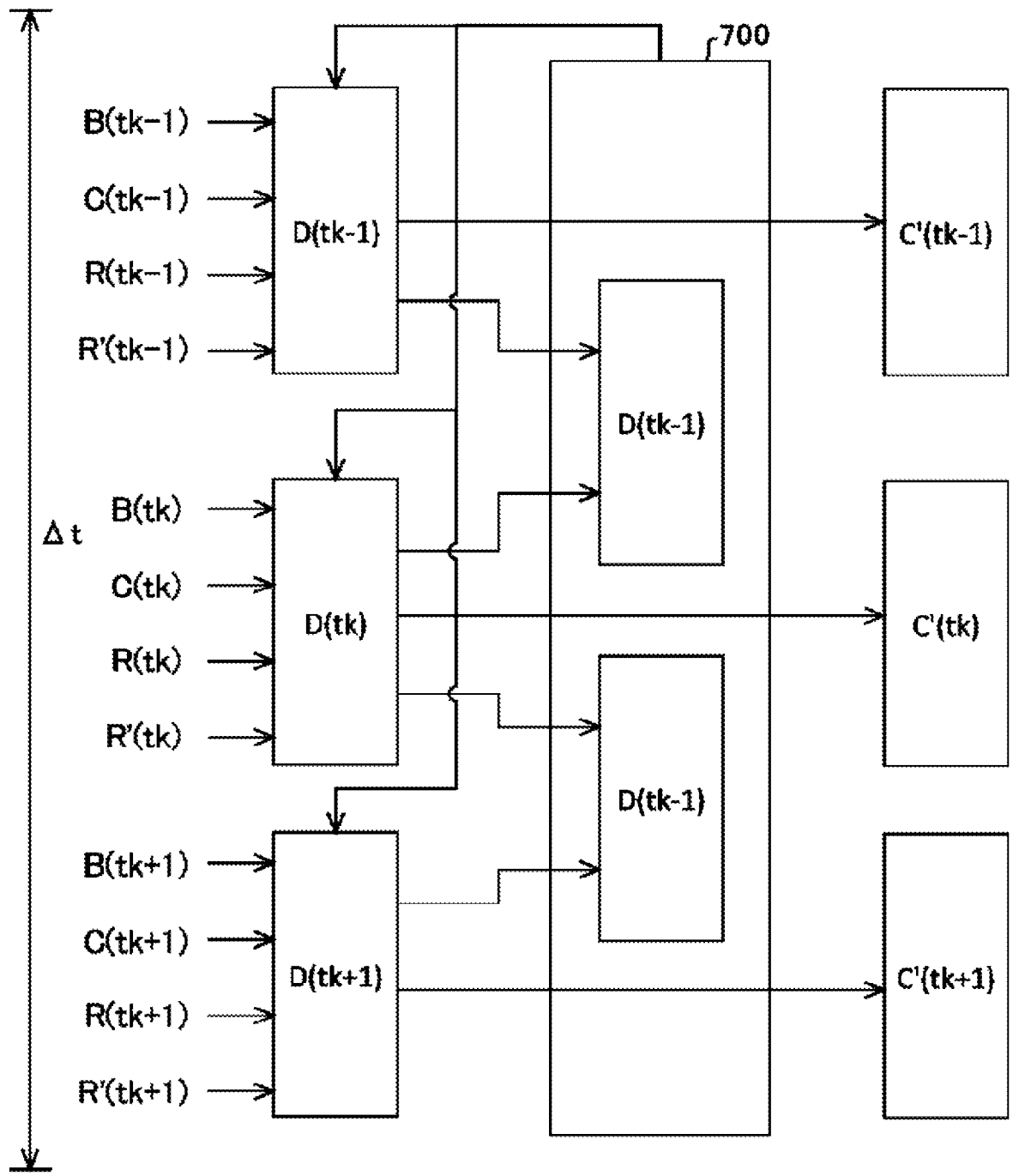
FIG. 7 illustrates one example of another generation flow of the broadcast plan.

FIG. 7 illustrates one example of another generation flow of the broadcast plan. The broadcast data B, the broadcast data C, the broadcast data R and the broadcast data R' are the broadcast data generated by the same method with the method described with reference to FIG. 4. Also, in FIG. 7, the letters in parentheses in each of the broadcast data B, the broadcast data C, the broadcast data R, and the broadcast data R' indicate the clock time. For example, B(tk) is the broadcast data selected as the broadcast data that can be broadcasted at clock time tk according to the predetermined criteria.

The broadcast plan generation unit 240 is configured to tentatively select broadcast data D (D(tk−1), D(tk), D(tk+1)) to be broadcasted at each clock time (tk−1, tk, tk+1) within the period $\Delta$ t. The broadcast plan generation unit 240 is configured to acquire differential information (block 700) of the broadcast data D in a time sequence, and select the broadcast data that are selected as the broadcast data D so that the differential information satisfies a predetermined condition. For example, when the automated drive level corresponds to the broadcast data, the broadcast plan generation unit 240 may make the rate of change of the automated drive level per unit time be less than a predetermined value. The mapping between the broadcast data and the automated drive level is described below. Also, when the information intensity of the broadcast data is mapped to the broadcast data, the broadcast plan generation unit 240 may ensure that the rate of change of the information intensity per unit time is greater than or equal to a predetermined value. The information intensity may be pre-mapped to the broadcast data, for example, according to the content to be broadcasted as the broadcast data. The broadcast plan generation unit 240 may also ensure that the provided amount per unit time of the broadcast data generated from the advertising data is greater than or equal to a predetermined value.

When the broadcast data D with a combination of differential information satisfying a predetermined condition is found, the broadcast plan generation unit 240 is configured to determine that broadcast data D as the broadcast data C' to be broadcasted. It is noted that when the broadcast data D of a combination with differential information satisfying a predetermined condition cannot be determined, the setting unit 220 may change the automated drive level of the movable object 20 and re-search for the broadcast data D. Also, when the broadcast data satisfying a predetermined condition cannot be determined, the travelling road identification unit 210 may change the predetermined travelling road of the movable object 20 and re-search for the broadcast data D.

FIG. 8 illustrates information intensity per type of the broadcast data. The information intensity is set by using the value of 0 to 6. It is shown that the larger the value of information intensity, the higher the information intensity of the corresponding type of the broadcast data. The information intensity is set for each automated drive level. The information intensity 0 indicates that the corresponding type of the broadcast data is not broadcasted. For example, the information intensity 0 indicates that the information is not important at the corresponding automatic operation level.

In the types of broadcast data, "Road A" indicates the broadcast data related to the change of the automated drive level. For example, "Road A" includes the broadcast data for broadcasting that the automated drive level is to be changed. "Road A" is set to information intensity 6 for all of the automated drive levels.

"Road B" indicates the broadcast data that affects automated drive. "Road B" includes the broadcast data for broadcasting that an accident has occurred and so on. "Road B" is set to information intensity 5 for all of the automated drive levels.

"Road C" indicates the broadcast data related to the change of the destination. For example, "Road C" includes broadcast data for broadcasting that a fire has occurred at the destination, broadcast data for broadcasting that the weather at the destination is very rough, broadcast data for broadcasting that the arrival at the destination may be significantly delayed, and so on. "Road C" is set to information intensity 4 for all of the automated drive levels.

The information intensity of the broadcast data of "Road A", "Road B" and "Road C" is set to be higher than the information intensity of any other type of broadcast data.

"Advertisement A" indicates the advertising data that the occupant 80 is inferred to be interested in. Advertisements that are inferred to be of interest to the occupant 80 may be identified based on historical information of the destination of the occupant 80, changes in the facial expression of the occupant 80 when the broadcast data of the advertising data is broadcasted and so on. For "advertisement A", the information intensity is set to 3 for automated drive level 3 or higher, and is set to 2 that is lower information intensity for automated drive level 2 or lower.

"Advertisement B" indicates the advertising data that relates to the point close to the predetermined travelling road. "Advertisement B" includes the advertising data of the point close to the predetermined travelling road of the movable object 20. "Advertisement B" is set to information intensity 2 for all of the automated drive levels.

"Advertisement C" indicates advertising data that does not correspond to either of advertisement A or advertisement B. In "advertisement C", the information intensity is set to 1 for automated drive level 3 or higher, and is set to 0 for automated drive level 2 or lower. Therefore, the broadcast data corresponding to "advertisement C" is not to be broadcasted when the automated drive level is 2 or lower.

"News A" indicates the news data that the occupant 80 is inferred to be interested in. Whether the news data are those that are inferred to be of interest to the occupant 80 or not may be identified based on changes in the facial expression of the occupant 80 when the news data is broadcasted and so on. For "news A", the information intensity is set to 3 for automated drive level 3 or higher, and is set to 2 that is lower information intensity for automated drive level 2 or lower.

"News B" indicates the news data that relates to the point close to the predetermined travelling road. "News B" includes news data for broadcasting news that has occurred at the destination of the movable object 20. For "news B", the information intensity is set to 2 for automated drive level 3 or higher, is set to 1 that is lower information intensity for automated drive level 2 and 1, and is set to 0 for automated drive level 0. Therefore, the broadcast data corresponding to "news B" is not to be broadcasted when the automated drive level is 0.

"News C" indicates news data that does not correspond to either of news A or news B. "Chat" is broadcast data to be broadcasted along with conversations with chat or conversation systems such as SNS. For "news C" and "chat", the information intensity is set to 1 for automated drive level 3 or higher, and is set to 0 for automated drive level 2 or lower. Therefore, the broadcast data of "news C" and the broadcast data of "chat" are not allowed to be broadcasted when the automated drive level is 2 or lower.

It is noted that the "type" is an example of the "information attribute". Also, the "information intensity" is an example of the "information attribute". The "information attribute" may be a combination of the "type" and the "information intensity".

When setting the broadcast data for a management unit, the broadcast plan generation unit 240 refers to the information of intensity to determine the order for setting the broadcast data so that the change in the information intensity in a time sequence satisfies a predetermined condition.

Figure 9:
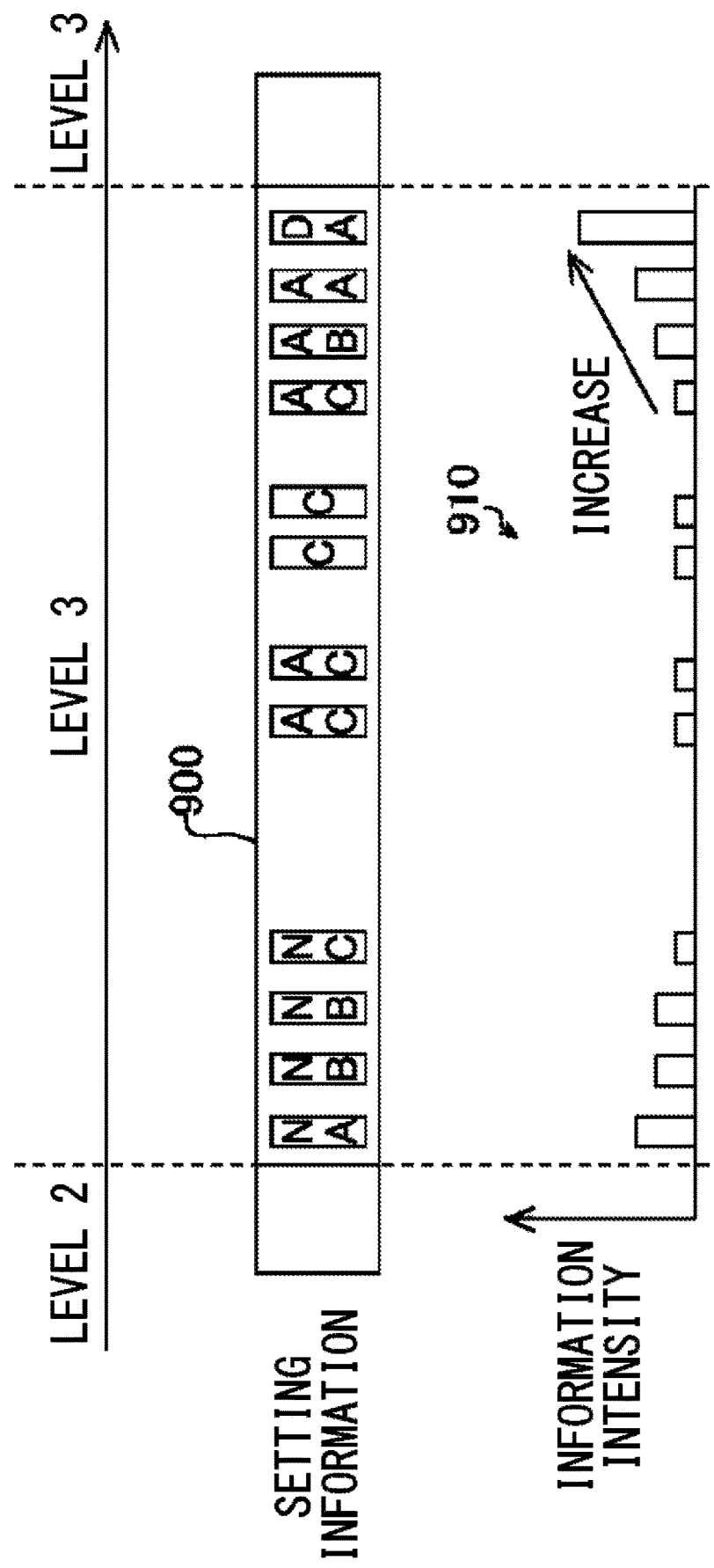
FIG. 9 schematically illustrates a data structure of setting information showing an order for setting broadcast data.

FIG. 9 schematically illustrates a data structure of setting information showing the order of setting the broadcast data. FIG. 9 illustrates the setting information for setting the broadcast data within a management unit 900 of automated drive level 3 in the case where the automated drive level switches from 2 to 3 to 2. In FIG. 9, "NA", "NB" and "NC" respectively indicates the setting of the broadcast data of news A, news B and news C. "AA", "AB" and "AC" respectively indicates the setting of the broadcast data of advertisement A, advertisement B and advertisement C. "C" indicates the setting of the chat broadcast data.

Graph 910 of FIG. 9 illustrates a change in a time sequence of the magnitude of the information intensity. As shown in graph 910, before the switching point of the automated drive level, the broadcast data is set to increase in the information intensity. This allows the setting of the broadcast data so that the information intensity gradually increases before the point where the automated drive level decreases when travelling in the automated drive mode. Therefore, it is possible to gradually direct the attention of the occupant 80 to the broadcast data. Then, when it becomes close to a point where the automated drive level is reduced, it broadcasts the broadcast data indicating that the automated drive level is to be reduced. This ensures that the occupant 80 does not miss any of the broadcast data.

It is noted that as shown in FIG. 9, when the automated drive level has switched from 2 to 3, the broadcast data are arranged so that the information intensity gradually decreases. Immediately after switching to automated drive, since the attention of the occupant 80 with respect to the broadcast data is relatively high, the broadcast data with high information intensity is provided. As time passes after switching to the automated drive mode, the information intensity is reduced. This enables useful broadcast data to be provided to the occupant 80 when the attention of the occupant 80 is directed to the broadcast data.

Also, according to the setting information illustrates in FIG. 9, after the automated drive level switches from 2 to 3, it is set to collectively broadcast the broadcast data of the news. Also after that, it is set that the broadcast data of a plurality of advertisements are collectively broadcasted, and the chat broadcast data are collectively broadcasted. This enables the broadcast data of specific types to be presented together, and enables the suppression of broadcasting different types of the broadcast data in an inconsistent manner.

FIG. 10 illustrates a data structure of first occupant action information for evaluating a first action of the occupant 80. The first occupant action information associates an user ID and an action information. The user ID is identification information of the occupant 80. The action information includes a plurality of evaluation factors. Examples of evaluation factors can be cherry blossoms, hot springs, restaurants, or any other elements.

For example, assuming that park A is at a waypoint before the destination of the movable object 20, and park A is not set as a transit point. In this case, the broadcast plan generation unit 240 is configured to determine whether the movable object 20 has stopped at park A for a predetermined period of time or longer after the occupant 80 is broadcasted with the broadcast data including the message saying "in another O kilometers, park A will be reached, and the cherry blossoms in park A are now at their best." When the broadcast plan generation unit 240 is configured to determine that the movable object 20 has stopped in park A for a predetermined period of time or longer, it counts up the identification information of the occupant 80 and the evaluation value associated with the "cherry blossom". In this way, the broadcast plan generation unit 240 counts up the evaluation value when it is determined that the occupant 80 has taken a predetermined action in response to the broadcast data.

The broadcast plan generation unit 240 is configured to estimate that the occupant 80 is interested in the evaluation factor whose evaluation value is greater than a predetermined threshold value. Then, the broadcast plan generation unit 240 is configured to prioritize the broadcast data to which the evaluation factor is associated as the broadcast data to be broadcasted. For example, in the above example, when the identification information of the occupant 80 and the evaluation value associated with "cherry blossom" are greater than a predetermined threshold value, the broadcast plan generation unit 240 performs the processing of classifying the broadcast data with the evaluation factor of "cherry blossom" as "advertisement A" and arranging the broadcast data. In this way, the broadcast data with a "cherry blossom" evaluation factor for the action attribute of the occupant 80 is arranged as broadcast data with high information intensity.

FIG. 11 illustrates a data structure of second occupant action information for evaluating a second action of the occupant 80. The second occupant action information associates an user ID and an action information. The user ID is identification information of the occupant 80. The action information includes a destination related advertisement and a waypoint related advertisement as an evaluation factor.

As mentioned above, when there is a park on a waypoint before the destination of the movable object 20 and the park A is not set as a transit point, after the occupant 80 is broadcasted with the broadcast data including the message saying "in another O kilometers, park A will be reached, and the cherry blossoms in park A are now at their best.", it is supposed that the movable object 20 has stopped in park A for a predetermined period of time or longer. In this case, the broadcast plan generation unit 240 is configured to count up the evaluation value corresponding to the identification information of the occupant 80 and the "waypoint related advertisement".

Also, when there is a park C near the destination of the movable object 20, after the occupant 80 is broadcasted with the broadcast data including the message saying "there is a park C near the destination, and the cherry blossoms in park C are now at their best.", the broadcast plan generation unit 240 supposes that the movable object 20 has stopped at park C for a predetermined period of time or longer. In this case, the broadcast plan generation unit 240 is configured to count up the evaluation value corresponding to the identification information of the occupant 80 and the "destination related advertisement".

In this way, when the evaluation value corresponding to the waypoint related advertisement and the identification information of the occupant 80 is greater than a predetermined value, the broadcast plan generation unit 240 is configured to determine that the occupant 80 tends to pay attention to the advertisement related to the waypoint, and set the broadcast data by evaluating the information intensity of the broadcast data based on the advertising data associated with the location near the waypoint to a larger value. Also, when the evaluation value corresponding to the destination related advertisement and the identification information of the occupant 80 is greater than a predetermined value, the broadcast plan generation unit 240 is configured to determine that the occupant 80 tends to pay attention to the destination-related advertisement, and set the broadcast data by evaluating the information intensity of the broadcast data based on the advertising data associated with the location near the destination to be larger.

Figure 12:
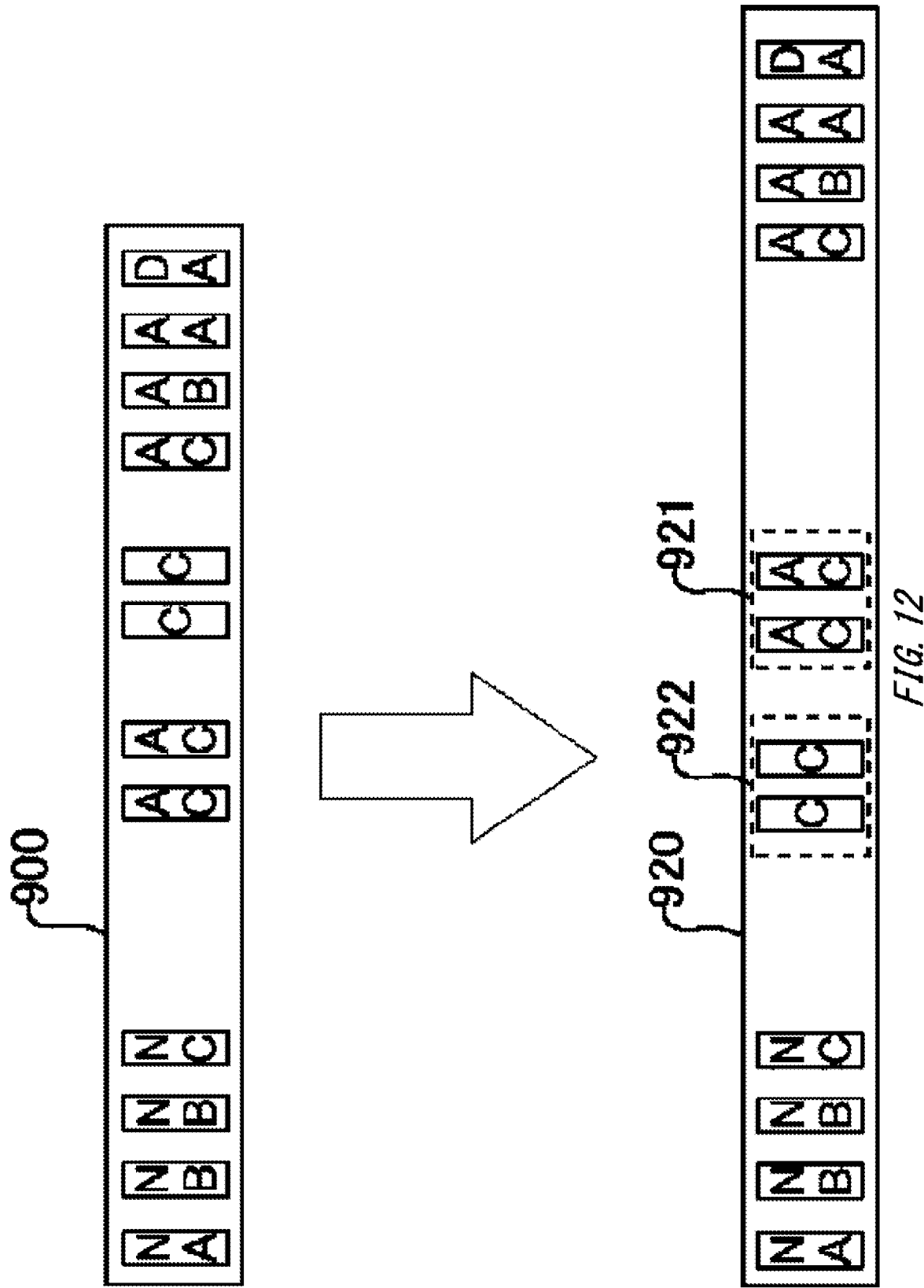
FIG. 12 illustrates one example of a method for resetting a broadcast plan.

FIG. 12 illustrates one example of a method for resetting the broadcast plan. FIG. 12 illustrates a case where the time of the management unit 900 has become longer due to a traffic jam or other reasons. When the travelling time corresponding to the management unit 900 is predicted to become longer, the setting unit 220 recalculates the clock time when the movable object 20 passes through the recommended switching point and the clock time when the movable object 20 passes through the waypoint. The broadcast plan generation unit 240 is configured to set the management unit 920 and reset the broadcast plan within the management unit 920 based on the clock time of passing through each point that is recalculated by the setting unit 220.

For example, in resetting the broadcast plan, the broadcast plan generation unit 240 is configured to determine that it is necessary to replace the order of one of the two advertisement C broadcast data, indicated by sign 921, with one of the two chat broadcast data, indicated by sign 922. In this case, the broadcast plan generation unit 240 is configured to replace the set of the two advertisement C broadcast data, indicated by sign 921, with the set of the two chat broadcast data, indicated by sign 922. This enables the broadcast data related to a specific phenomenon to be collectively broadcasted to the occupant 80.

As described above, according to the system 10, the broadcast data can be effectively broadcasted to the occupant 80.

The movable object 20 is, for example, a transport device. The transport device includes automobiles such as passenger vehicles or buses, saddle-wheeled vehicles, bicycles or other vehicles, as well as robots.

It is noted that the movable object 20 may have at least a part function of the above-mentioned broadcast server 40. For example, the broadcast apparatus 24 may have a function of the travelling road identification unit 210. The broadcast apparatus 24 may have a function of the setting unit 220. The broadcast apparatus 24 may have a function of the broadcast plan generation unit 240.

Figure 13:
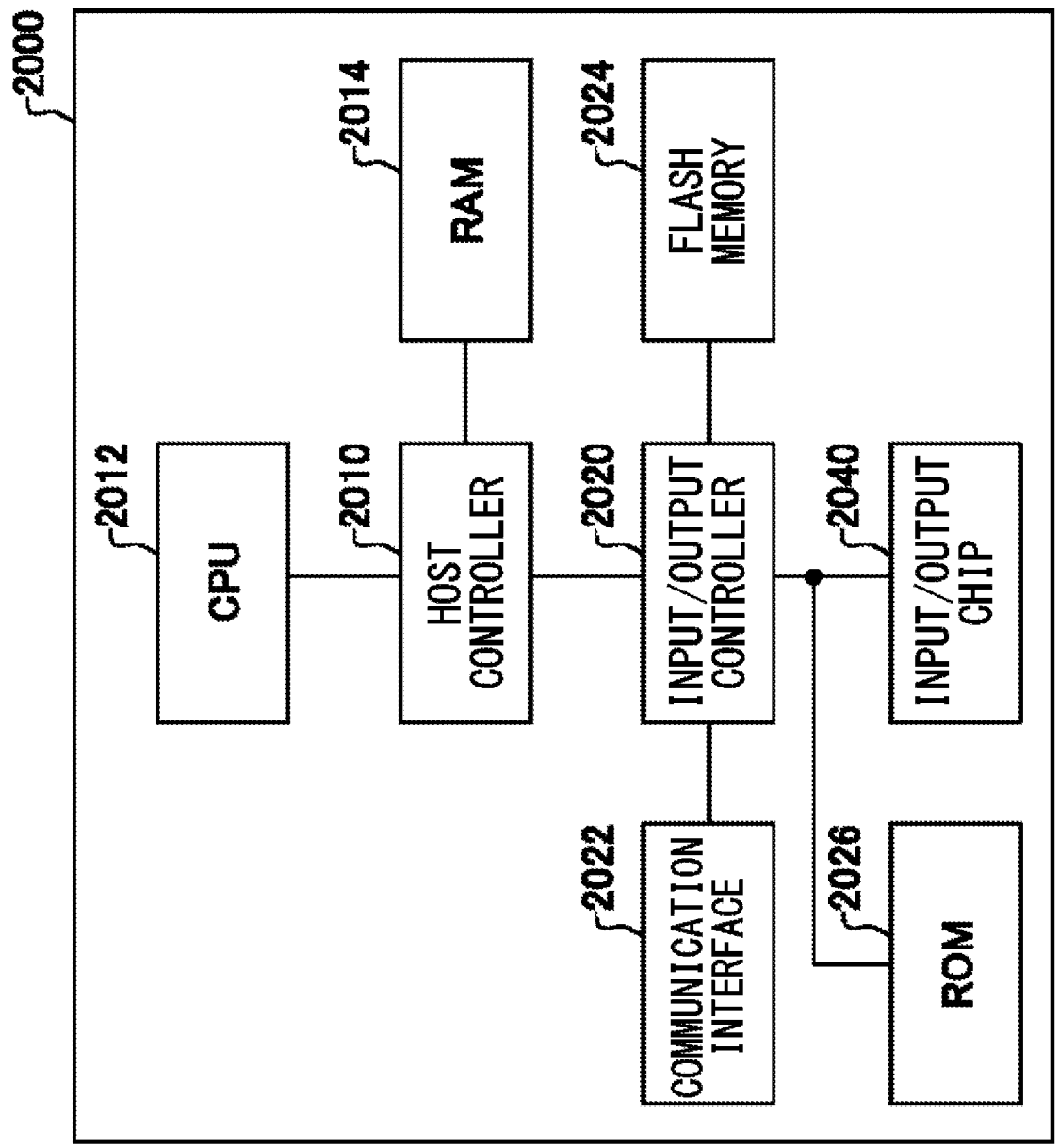
FIG. 13 illustrates an example of a computer 2000.

FIG. 13 illustrates an example of a computer 2000 in which a plurality of embodiments of the present invention may be entirely or partially embodied. A program that is installed in the computer 2000 can cause the computer 2000 to function as an apparatus such as the control apparatus 200 associated with the embodiment or as each unit of the apparatus, cause the computer 2000 to perform operations associated with the apparatus or each unit of the apparatus, and/or cause the computer 2000 to perform the process associated with the embodiment or steps thereof. Such a program may be executed by a CPU 2012 in order to cause the computer 2000 to execute a specific operation associated with some or all of the blocks in the process procedure and the block diagram described in this specification.

The computer 2000 according to the present embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

The program is provided via a network or a computer readable medium such as a CD-ROM, a DVD-ROM, or a memory card. The RAM 2014, the ROM 2026, or the flash memory 2024 is an example of the computer readable medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing, based on the processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various types of processes on the data on the RAM 2014. The CPU 2012, then, writes back the processed data into the recording medium.

Various types of programs and various types of information such as data, tables, and databases may be stored in the recording medium, and they may be performed information processing on. The CPU 2012 may perform, on the data read from the RAM 2014, various kinds of processing including various kinds of operations, information processing, conditional determinations, conditional branching, unconditional branching, information searching/replacing and the like described in this specification and specified by an instruction sequence of the program, and writes back the result into the RAM 2014. Also, the CPU 2012 may search for information in a file, a database and so on, in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that matches with a condition, read the attribute value of the second attribute stored in the entry, and thereby obtain the attribute value of the second attribute associated with the first attribute meeting a predetermined condition.

The program or software module described above may be stored on the computer 2000 or in a computer readable medium near the computer 2000. The recording medium such as a hard disk or RAM provided in a server system connected to a dedicated communication network or the internet is available as a computer readable medium. The program stored in the computer readable medium may be provided to the computer 2000 via the network.

The programs that are installed in the computer 2000 and respectively cause the computer 2000 to function as the control apparatus 200 may act to the CPU 2012 and the like, thereby causing the computer 2000 to function as each unit of the control apparatus 200. The information processing described in the programs are read into the computer 2000 to function as each unit of the control apparatus 200 that is a specific means in which software and the above-mentioned diverse types of hardware resources cooperate with each other. Then, these specific means construct the control apparatus 200 specific for a use purpose by implementing operations or processing of information depending on the use purpose of the computer 2000 in the present embodiment.

A variety of embodiments have been described with reference to the block diagram and the like. In the block diagram, each block may represent (1) a step of a process in which an operation is performed, or (2) each unit of the apparatus having a role of performing the operation. Specific steps and each unit may be implemented by a dedicated circuit, a programmable circuit provided along with a computer readable instruction stored on a computer readable medium, and/or a processor provided along with the computer readable instruction stored on the computer readable medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation;

and a memory element such as a flip-flop, a register, a field programmable gate array (FPGA), a programmable logic array (PLA); and so on.

The computer readable medium may include any tangible device capable of storing an instruction executed by an appropriate device, so that the computer readable medium having the instruction stored thereon constitutes at least a part of a product including the instruction that may be executed in order to result in a means for executing an operation specified by a processing procedure or a block diagram. Examples of the computer readable medium may include electronic storage medium, magnetic storage medium, optical storage medium, electromagnetic storage medium, semiconductor storage medium, and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk(registered trademark), JAVA(registered trademark), C++, etc., and conventional procedural programming languages, such as the "C" programming language or similar programming languages.

Computer readable instructions may be provided to a general-purpose computer, a special-purpose computer, or a processor or a programmable circuit of other programmable data processing apparatus, locally or via a local area network (LAN), a wide area network (WAN) such as the internet, and computer readable instructions may be executed in order to result in a means for executing operations specified by the described processing procedure or the block diagram. Examples of processors include computer processors, processing units, microprocessors, digital signal processors, controllers, microcontrollers or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: movable object; 22: automated drive control apparatus; 24: broadcast apparatus; 28: communication apparatus; 29: sensor; 40: broadcast server; 50: content server; 200: control apparatus; 210: travelling road identification unit; 220: setting unit; 240: broadcast plan generation unit; 270: broadcast control unit; 280: storage apparatus; 290: communication apparatus; 300: predetermined travelling road; 900: management unit; 910: graph; 920: management unit; 2000: computer; 2010: host controller; 2012: CPU; 2014: RAM; 2020: input/output controller; 2022: communication interface; 2024: flash memory; 2026: ROM; 2040: input/output chip

What is claimed is:

1. A control apparatus for controlling broadcast data to be broadcasted to an occupant of a movable object with an automated drive function, comprising:
a travelling road identification unit for identifying a predetermined travelling road of the movable object corresponding to a destination set in the movable object;
a setting unit for setting, according to the predetermined travelling road, a recommended switching point for switching from predetermined automated drive to driver subjected manual drive in the predetermined travelling road, and setting predetermined passage time when the movable object passes through the recommended switching point; and
a broadcast plan generation unit for generating a broadcast plan for broadcasting predetermined broadcast data to an occupant of the movable object according to the recommended switching point; wherein
the broadcast plan generation unit is configured to determine an order of the broadcast data to be broadcasted within a predetermined period before or after the recommended switching point, based on an information attribute of the broadcast data.

2. The control apparatus according to claim 1, wherein:
the broadcast plan generation unit arrays the broadcast data so that an order of the information attribute of the broadcast data to be broadcasted is a predetermined order within a predetermined period before the recommended switching point.

3. The control apparatus according to claim 1, wherein:
the automated drive has a plurality of automated drive modes being set therein according to according to an amount of operations of an automated drive control apparatus included by the movable object; and
the broadcast plan generation unit is configured to set broadcast data of an information attribute corresponding to the automated drive mode set for the predetermined travelling road.

4. The control apparatus according to claim 2, wherein:
the automated drive has a plurality of automated drive modes being set therein according to according to an amount of operations of an automated drive control apparatus included by the movable object; and
the broadcast plan generation unit is configured to set broadcast data of an information attribute corresponding to the automated drive mode set for the predetermined travelling road.

5. The control apparatus according to claim 1, wherein:
the information attribute includes information intensity of the broadcast data.

6. The control apparatus according to claim 2, wherein:
the information attribute includes information intensity of the broadcast data.

7. The control apparatus according to claim 3, wherein:
the information attribute includes information intensity of the broadcast data.

8. The control apparatus according to claim 4, wherein:
the information attribute includes information intensity of the broadcast data.

9. The control apparatus according to claim 5, wherein:
the broadcast data includes road related broadcast data and advertising data related to the predetermined travelling road, and information intensity of the road related broadcast data is higher than that of the advertising data.

10. The control apparatus according to claim 6, wherein:
the broadcast data includes road related broadcast data and advertising data related to the predetermined travelling road, and information intensity of the road related broadcast data is higher than that of the advertising data.

11. The control apparatus according to claim 5, wherein:
the broadcast data includes road related broadcast data related to the predetermined travelling road and waypoint related broadcast data related to a waypoint of a predetermined travelling road, and the information intensity of the road related broadcast data is higher than that of the waypoint related broadcast data.

12. The control apparatus according to claim 6, wherein:
the broadcast data includes road related broadcast data related to the predetermined travelling road and waypoint related broadcast data related to a waypoint of a predetermined travelling road, and the information intensity of the road related broadcast data is higher than that of the waypoint related broadcast data.

13. The control apparatus according to claim 5, further comprising:
an occupant state acquisition unit for acquiring a state of an occupant of the movable object; wherein
the broadcast plan generation unit is configured to identify actions of the occupant with respect to a broadcast of the broadcast data based on a state of the occupant, and to set information intensity for the broadcast data of every of the occupant based on actions of the occupant.

14. The control apparatus according to claim 6, further comprising:
an occupant state acquisition unit for acquiring a state of an occupant of the movable object; wherein
the broadcast plan generation unit is configured to identify actions of the occupant with respect to a broadcast of the broadcast data based on a state of the occupant, and to set information intensity for the broadcast data of every of the occupant based on actions of the occupant.

15. The control apparatus according to claim 13, wherein:
the broadcast data includes destination related advertising data related to a destination, and waypoint related advertisement data related to a waypoint of a predetermined travelling road; and
the broadcast plan generation unit is configured to set the information intensity for destination related advertising data and waypoint related advertisement data of every of the occupant based on actions of the occupant with respect to a broadcast of the destination related advertising data and the waypoint related advertisement data.

16. The control apparatus according to claim 13, wherein:
the information attribute includes a type of the broadcast data;
the broadcast plan generation unit is configured to:
select a plurality of the broadcast data to be broadcasted continuously based on a type of the broadcast data; and
determine an order of broadcasting a plurality of the selected broadcast data with consideration of information intensity identified based on actions of the occupant.

17. The control apparatus according to claim 1, further comprising:
a broadcast control unit for broadcasting the broadcast data to an occupant of the movable object in an order determined by the broadcast plan generation unit.

18. A system, comprising:
the control apparatus according to claim 1; and
the movable object.

19. A non-transitory computer readable storage medium with a program configured to cause a computer to function as a control apparatus for controlling broadcast data to be broadcast to an occupant of a movable object with an automated drive function stored thereon, wherein:
the program is configured to cause the computer to function as:
a travelling road identification unit for identifying a predetermined travelling road of the movable object corresponding to a destination set by the movable object;
a setting unit for setting, according to the predetermined travelling road, a recommended switching point for switching from predetermined automated drive to driver subjected manual drive in the predetermined travelling road, and setting predetermined passage time when the movable object passes through the recommended switching point; and
a broadcast plan generation unit for generating a broadcast plan for broadcasting predetermined broadcast data to an occupant of the movable object according to the recommended switching point, wherein the broadcast plan generation unit is configured to determine an order of the broadcast data to be broadcasted within a predetermined period before or after the recommended switching point based on an information attribute of the broadcast data.

20. A control method for controlling broadcast data to be broadcasted to an occupant of a movable object with an automated drive function, comprising:
identifying a predetermined travelling road of the movable object corresponding to a destination set in the movable object;
setting, according to the predetermined travelling road, a recommended switching point for switching from predetermined automated drive to driver subjected manual drive in the predetermined travelling road, and setting predetermined passage time when the movable object passes through the recommended switching point; and
generating a broadcast plan for broadcasting predetermined broadcast data to an occupant of the movable object according to the recommended switching point; wherein
the generating of a broadcast plan is configured to determine an order of the broadcast data to be broadcasted within a predetermined period before or after the recommended switching point based on an information attribute of the broadcast data.

* * * * *